(12) United States Patent
Claver et al.

(10) Patent No.: US 11,300,743 B2
(45) Date of Patent: Apr. 12, 2022

(54) OPTICAL FIBER DEVICE HAVING ANNULAR AND AXIAL GROOVES

(71) Applicant: PPC BROADBAND, INC., East Syracuse, NY (US)

(72) Inventors: Nicholas V. Claver, Liverpool, NY (US); Daniel Daoust, Syracuse, NY (US); Steve Stankovski, Clay, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 51 days.

(21) Appl. No.: 16/740,090

(22) Filed: Jan. 10, 2020

(65) Prior Publication Data

US 2020/0225433 A1 Jul. 16, 2020

Related U.S. Application Data

(60) Provisional application No. 62/790,499, filed on Jan. 10, 2019.

(51) Int. Cl.
  *G02B 6/44* (2006.01)
  *F21V 8/00* (2006.01)
  *G02B 6/36* (2006.01)

(52) U.S. Cl.
  CPC ......... *G02B 6/4408* (2013.01); *G02B 6/0038* (2013.01); *G02B 6/3636* (2013.01)

(58) Field of Classification Search
  CPC .............. G02B 6/44; G02B 6/36; G02B 6/00
  See application file for complete search history.

(56) References Cited

U.S. PATENT DOCUMENTS

| 5,473,723 | A | 12/1995 | Stockman et al. |
| 6,639,152 | B2 * | 10/2003 | Glew .................. G02B 6/4435 174/113 C |
| 9,419,375 | B2 * | 8/2016 | Dieduksman ...... H01R 13/5825 |
| 10,575,903 | B2 * | 3/2020 | Shimizu ................ A61B 18/22 |

(Continued)

OTHER PUBLICATIONS

Search Report and Written Opinion issued in corresponding International Patent Application No. PCT/US2020/013162 dated Apr. 6, 2020 (13 pages).

*Primary Examiner* — Tina M Wong
(74) *Attorney, Agent, or Firm* — MH2 Technology Law Group LLP

(57) ABSTRACT

A fiber optic cable assembly includes a fiber optic cable and a fiber optic connector. The fiber optic cable has an outer surface that includes a plurality of annular grooves spaced apart from one another in an axial direction of the fiber optic cable, and a plurality of axial grooves that extend in the axial direction. The plurality of axial grooves being spaced apart from one another in a circumferential direction of the fiber optic cable, the plurality of axial grooves are configured to divide the outer surface in a circumferential direction of the linear member into separate section, the separate sections are configured to hinge against each other such that the linear member is bendable to a predetermined bend radius, the fiber optic connector includes an axial ridge configured to be received by one of the plurality of axial grooves, and cooperative engagement between the axial ridge of the fiber optic connector and the one of the plurality of axial grooves of the fiber optic cable prevents rotation of the fiber optic cable relative to the fiber optic connector.

57 Claims, 12 Drawing Sheets

(56) References Cited

U.S. PATENT DOCUMENTS

| | | | |
|---|---|---|---|
| 2004/0266259 A1 | 12/2004 | Moseley | |
| 2005/0098342 A1 | 5/2005 | Sakabe et al. | |
| 2005/0199415 A1* | 9/2005 | Glew | H01B 7/295 174/113 C |
| 2006/0104579 A1* | 5/2006 | Fitz | G02B 6/4434 385/103 |
| 2007/0047883 A1 | 3/2007 | Watte et al. | |
| 2007/0102188 A1* | 5/2007 | Glew | H01B 3/445 174/113 C |
| 2007/0280611 A1* | 12/2007 | Dyer | G02B 6/4407 385/104 |
| 2008/0044145 A1* | 2/2008 | Jenkins | G02B 6/443 385/113 |
| 2008/0066947 A1* | 3/2008 | Glew | H01B 11/06 174/131 A |
| 2010/0111480 A1* | 5/2010 | Bohler | G02B 6/443 385/107 |
| 2010/0278492 A1* | 11/2010 | Bohler | G02B 6/4435 385/107 |
| 2012/0063731 A1* | 3/2012 | Fitz | G02B 6/4495 385/104 |
| 2013/0028568 A1* | 1/2013 | Beamon | G02B 6/4471 385/136 |
| 2013/0048338 A1* | 2/2013 | Suzuki | H01B 7/188 174/120 R |
| 2015/0268432 A1* | 9/2015 | Kato | G02B 6/4488 385/100 |
| 2016/0238813 A1* | 8/2016 | Stockton | G02B 6/3821 |
| 2017/0038533 A1* | 2/2017 | Segsworth | G02B 6/2558 |
| 2018/0128991 A1* | 5/2018 | Vallance | G02B 6/3862 |
| 2020/0012063 A1* | 1/2020 | Lambert | G02B 6/4438 |
| 2020/0225433 A1* | 7/2020 | Claver | G02B 6/0038 |
| 2020/0292772 A1* | 9/2020 | Oka | G02B 6/4432 |
| 2021/0026072 A1* | 1/2021 | Kanno | G02B 6/255 |

* cited by examiner

OPTICAL FIBER DEVICE HAVING ANNULAR AND AXIAL GROOVES

CROSS-REFERENCE TO RELATED APPLICATION

This nonprovisional application claims the benefit of U.S. Provisional Application No. 62/790,499, filed Jan. 10, 2019. The disclosure of the prior application is hereby incorporated by reference herein in its entirety.

BACKGROUND

The present disclosure relates to the processing of linear members, such as cables, ducts, and tubes, having annular and axial grooves. More particularly, the disclosure relates to a fiber optic cable having annular and axial grooves, and a fiber optic cable assembly that includes such a fiber optic cable.

Some conventional cables and ducts, for example, cables and ducts used in the fiber optic cabling industry, include a series of parallel annular (or circumferential) grooves in their outer surfaces. The grooves are typically formed in the outer wall of a smooth cable or duct. Such conventional cables or ducts having annular grooves may have flexibility to bend in a direction transverse to the longitudinal dimension of the cable or duct. Additionally, such conventional cable or ducts may be restrained from moving in the axial direction of the longitudinal dimension relative to, for example, a connector that is attached to an end of the cable or duct and includes an engagement structure that is configured to engage one or more of the annular grooves. However, such conventional cables and ducts are not prevented from rotating relative to the connector.

It may be desirable to provide a cable or duct that is configured to be engaged by an engagement structure of a connector such the cable or duct is prevented from rotating relative to the connector.

SUMMARY

According to various aspects of the disclosure, a fiber optic cable assembly includes a fiber optic cable and a fiber optic connector. The fiber optic cable has an outer surface that includes a plurality of annular grooves spaced apart from one another in an axial direction of the fiber optic cable, and a plurality of axial grooves that extend in the axial direction. The plurality of axial grooves being spaced apart from one another in a circumferential direction of the fiber optic cable, the plurality of axial grooves are configured to divide the outer surface in a circumferential direction of the fiber optic cable into separate section, the separate sections are configured to hinge against each other such that the fiber optic cable is bendable to a predetermined bend radius, the fiber optic connector includes an axial ridge configured to be received by one of the plurality of axial grooves, and cooperative engagement between the axial ridge of the fiber optic connector and the one of the plurality of axial grooves of the fiber optic cable prevents rotation of the fiber optic cable relative to the fiber optic connector.

In accordance with various aspects of the disclosure, a linear member includes an outer surface that includes an annular groove and an axial groove. The axial groove extends in an axial direction of the linear member. The axial groove is configured to be gripped by a connector to prevent rotation of the linear member relative to the connector.

In some embodiments, an additional axial groove in the outer surface extends in the axial direction and separates sections of the outer surface in a circumferential direction of the linear member.

In some embodiments, an additional annular groove separate sections of the outer surface. The separate sections are configured to hinge against each other such that the linear member is bendable to a predetermined bend radius.

In some embodiments, the linear member is terminated with a connector, and the connector includes an engagement feature configured to be received by the axial groove of the linear member. In some aspects, the engagement feature is an axial ridge configured to be received by the axial groove. In some aspects, the connector is a fiber optic connector and the linear member is a fiber optic cable. In some aspects, cooperative engagement between the engagement feature of the connector and the axial groove of the linear member prevents rotation of the linear member relative to the connector.

In some embodiments, the linear member is a duct, a cable, or a tube.

BRIEF DESCRIPTION OF THE DRAWINGS

Features and advantages of the present disclosure are described in, and will be apparent from, the following Brief Description of the Drawings and Detailed Description.

DETAILED DESCRIPTION OF EMBODIMENTS

Figure 1:
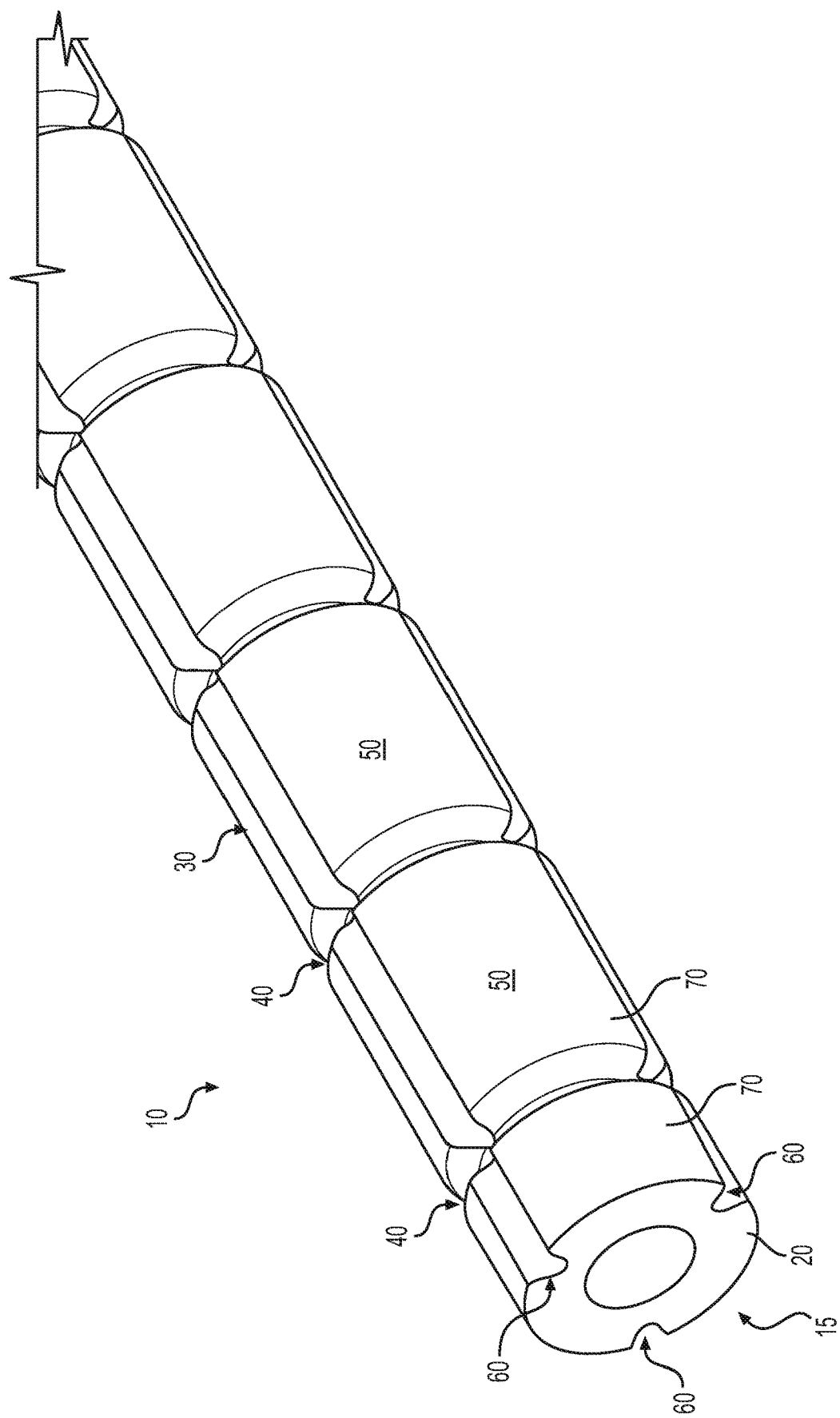
FIG. 1 is a perspective view of an exemplary embodiment of a linear member in accordance with various aspects of the disclosure.

Throughout the description, like reference numerals will refer to like parts in the various drawing figures. As a preface to the detailed description, it should be noted that, as used in this specification and the appended claims, the singular forms "a," "an," and "the" include plural referents, unless the context clearly dictates otherwise.

Figure 2:
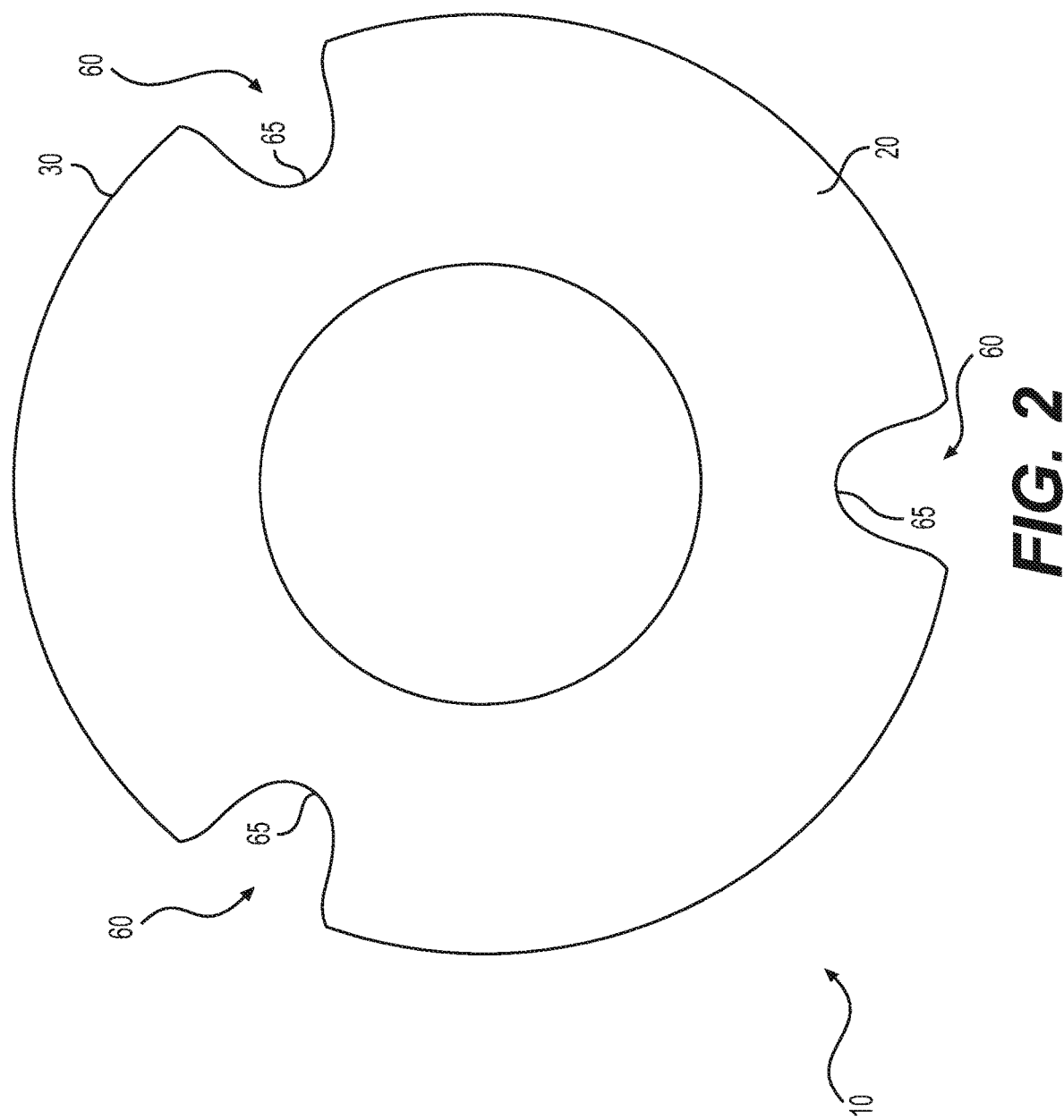
FIG. 2 is a cross-sectional view of the exemplary linear member of FIG. 1 along line II-II.

FIGS. 1 and 2 illustrate an exemplary linear member linear member 10, for example, a cable, duct, or tube, according to various aspects of the present disclosure. Linear member 10 is a tubular member 20 having an outer surface 30 that includes a plurality of annular grooves 40, which separate sections 50 of the outer surface 30. As is known, the provision of the series of annular grooves causes the separate sections 50 to hinge against each other, such that the linear member 10 can be easily bent to a predetermined bend radius, but a very substantial force must be applied to bend the linear member to a smaller bend radius.

The linear member 10 further includes a plurality of axial grooves 60 that extend in a direction of the longitudinal dimension of the linear member 10. The axial grooves 60 separate sections 70 of the outer surface 30 in the circumferential direction of the linear member 10. The axial grooves 60 provide a structure that can be gripped by an engagement feature of, for example, a connector that terminates an end 15 of the linear member 10. The axial grooves 60 may also increase the flexibility of the linear member 10, for example, the torsional flexibility of the linear member 10 about its longitudinal axis.

Figure 3:
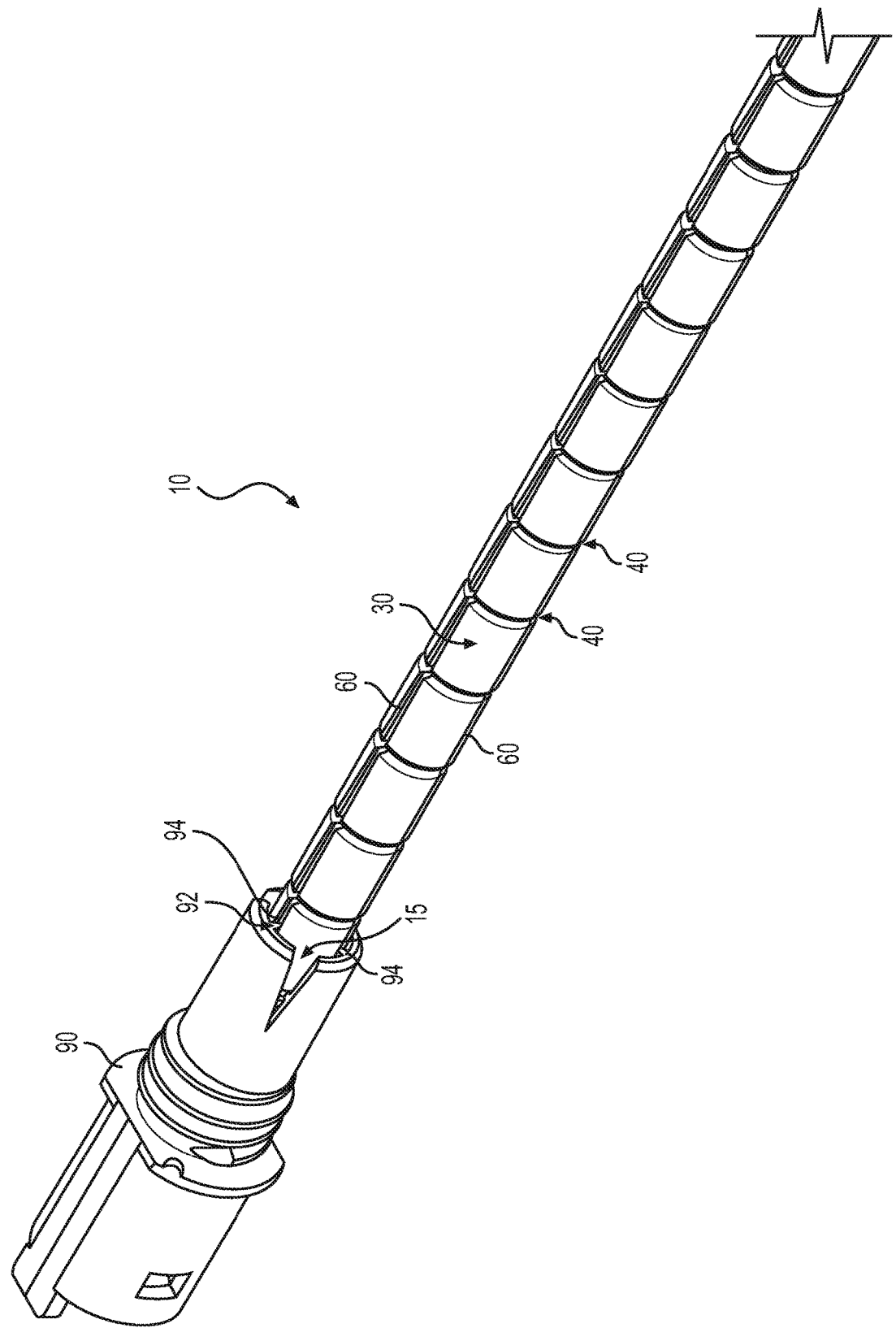
FIG. 3 is a perspective view of the exemplary linear member of FIG. 1 terminated with an exemplary connector.
Figure 4:
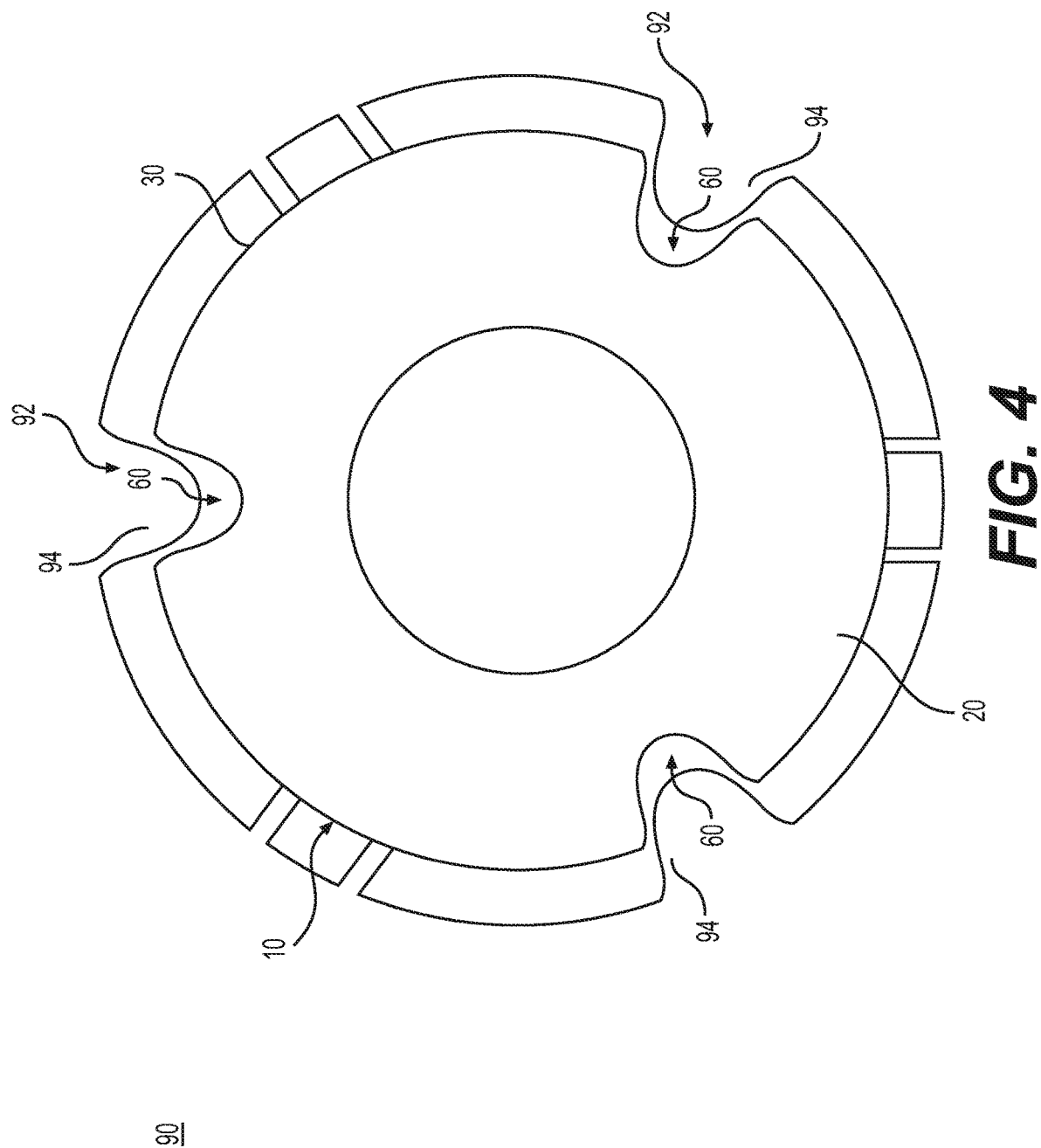
FIG. 4 is a cross-sectional view of the exemplary linear member of FIG. 1 along line IV-IV.

Referring to FIGS. 3 and 4, a connector 90 terminates the end 15 of the linear member 10. In the embodiment of FIGS. 3 and 4, the connector 90 is a fiber optic connector and the linear member 10 is a fiber optic cable. The connector 90 includes an engagement feature 92 in the form of axial ridges 94 that are configured to be received by the axial grooves 60 of the linear member 10. Cooperative engagement between the engagement feature 92 of the connector 90 and the axial groove 60 of the linear member 10 prevents rotation of the linear member 10 relative to the connector 90.

In the embodiment illustrated in FIGS. 3 and 4, the linear member 10 includes three axial grooves 60 extending along an entire length of the linear member 10, and the connector includes three axial ridges 94 that are configured to be received by the three axial grooves 60. It should be understood that, in some embodiments, the connector 90 may instead include one or two axial ridges 94 that are configured to be received in one or two of the three axial grooves 60, respectively. Cooperative engagement between at least one engagement feature 92 of the connector 90 and at least one axial groove 60 of the linear member 10 prevents rotation of the linear member 10 relative to the connector 90.

Figure 5:
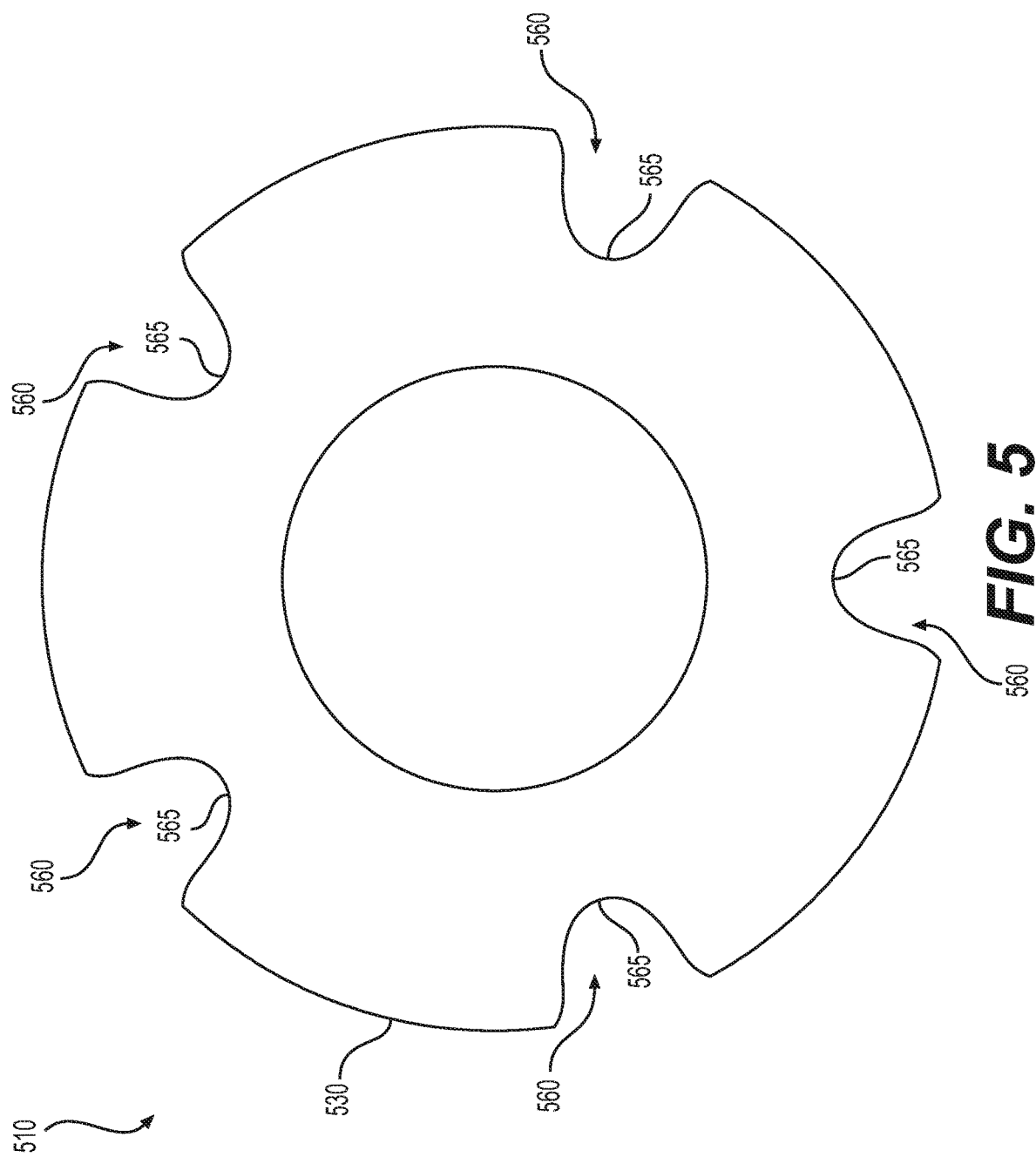
FIG. 5 is a cross-sectional view of another exemplary embodiment of a linear member in accordance with various aspects of the disclosure

It should also be understood that, in various embodiments, the linear member 10 may include less or more than three axial grooves and the connector may include a number of axial ridges equal to or less than the number of axial grooves, as long as each axial ridge is arranged to be received by an axial groove. For example, as shown in the embodiment of FIG. 5, a linear member 510 may include five axial grooves 560.

Figure 6:
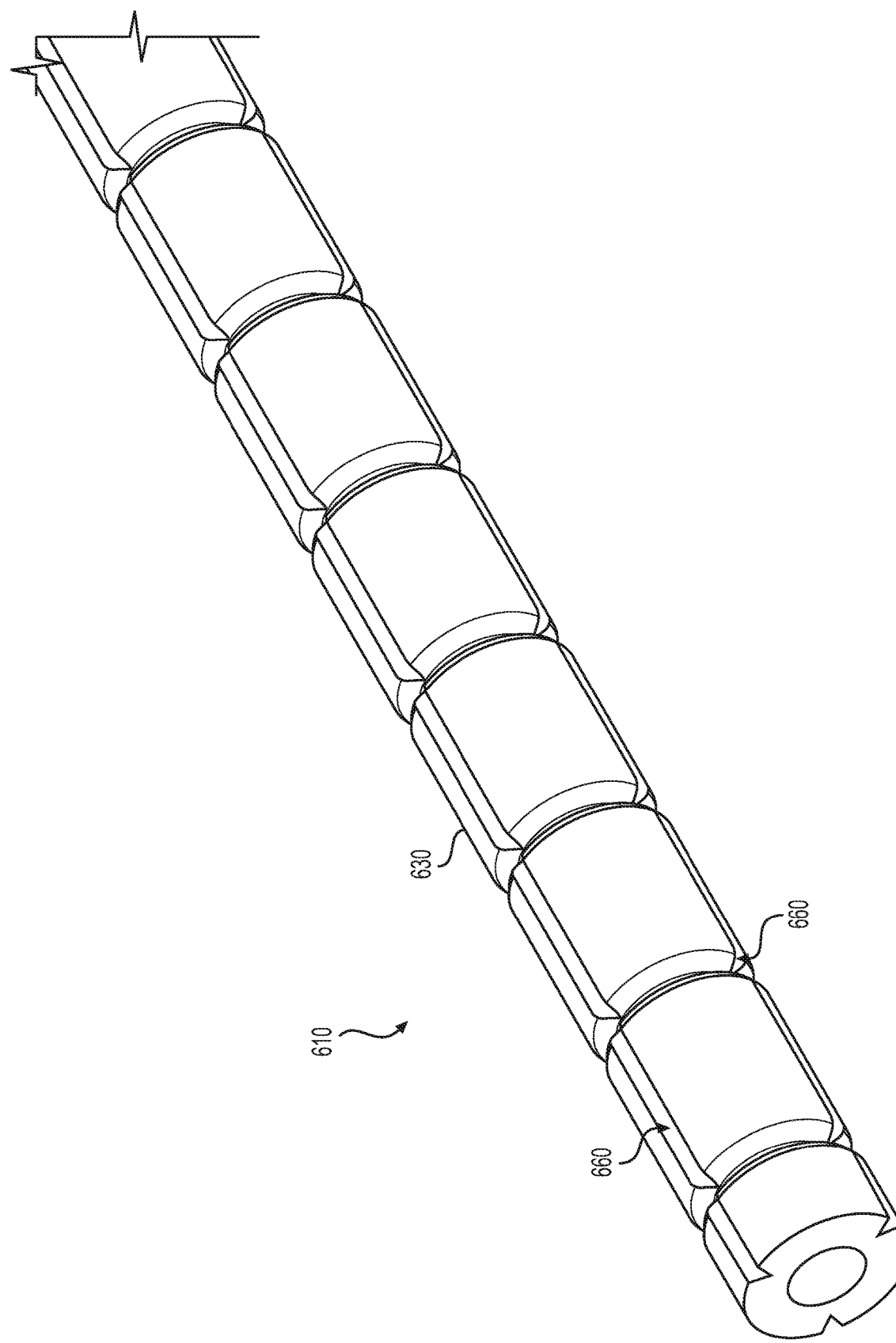
FIG. 6 is a perspective view of another exemplary embodiment of a linear member in accordance with various aspects of the disclosure.
Figure 7:
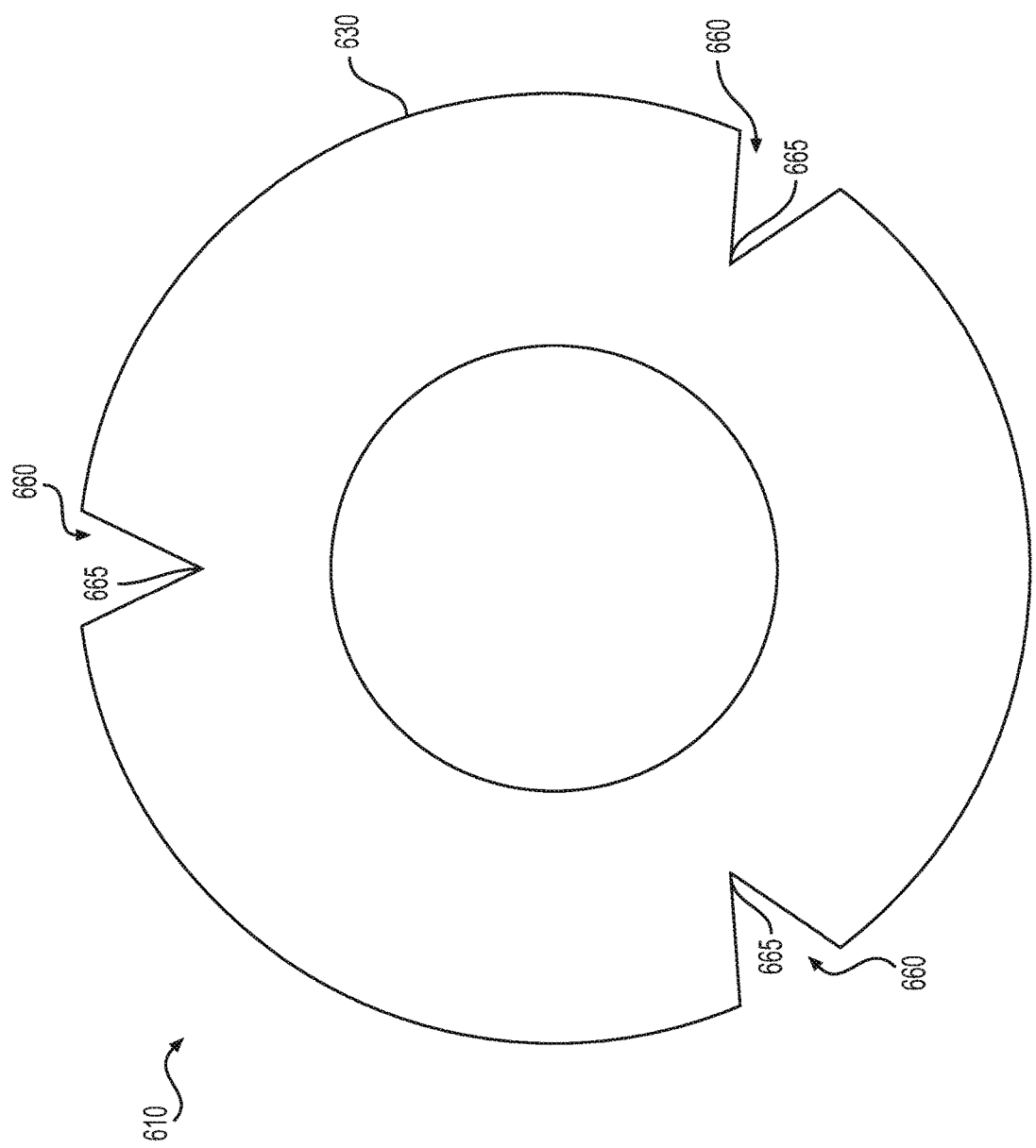
FIG. 7 is a cross-sectional view of the exemplary linear member of FIG. 6 along line VII-VII.
Figure 8:
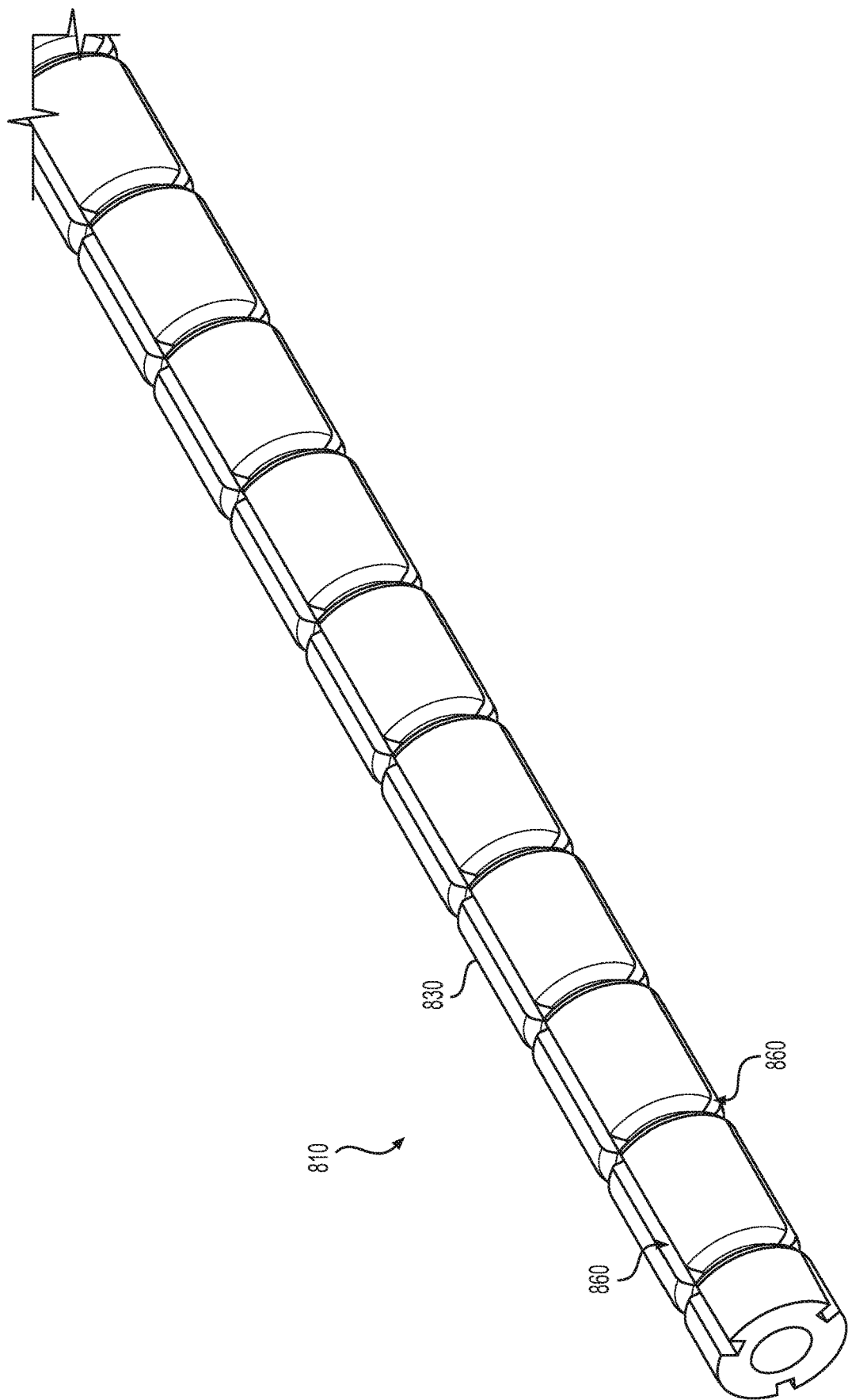
FIG. 8 is a perspective view of another exemplary embodiment of a linear member in accordance with various aspects of the disclosure.
Figure 9:
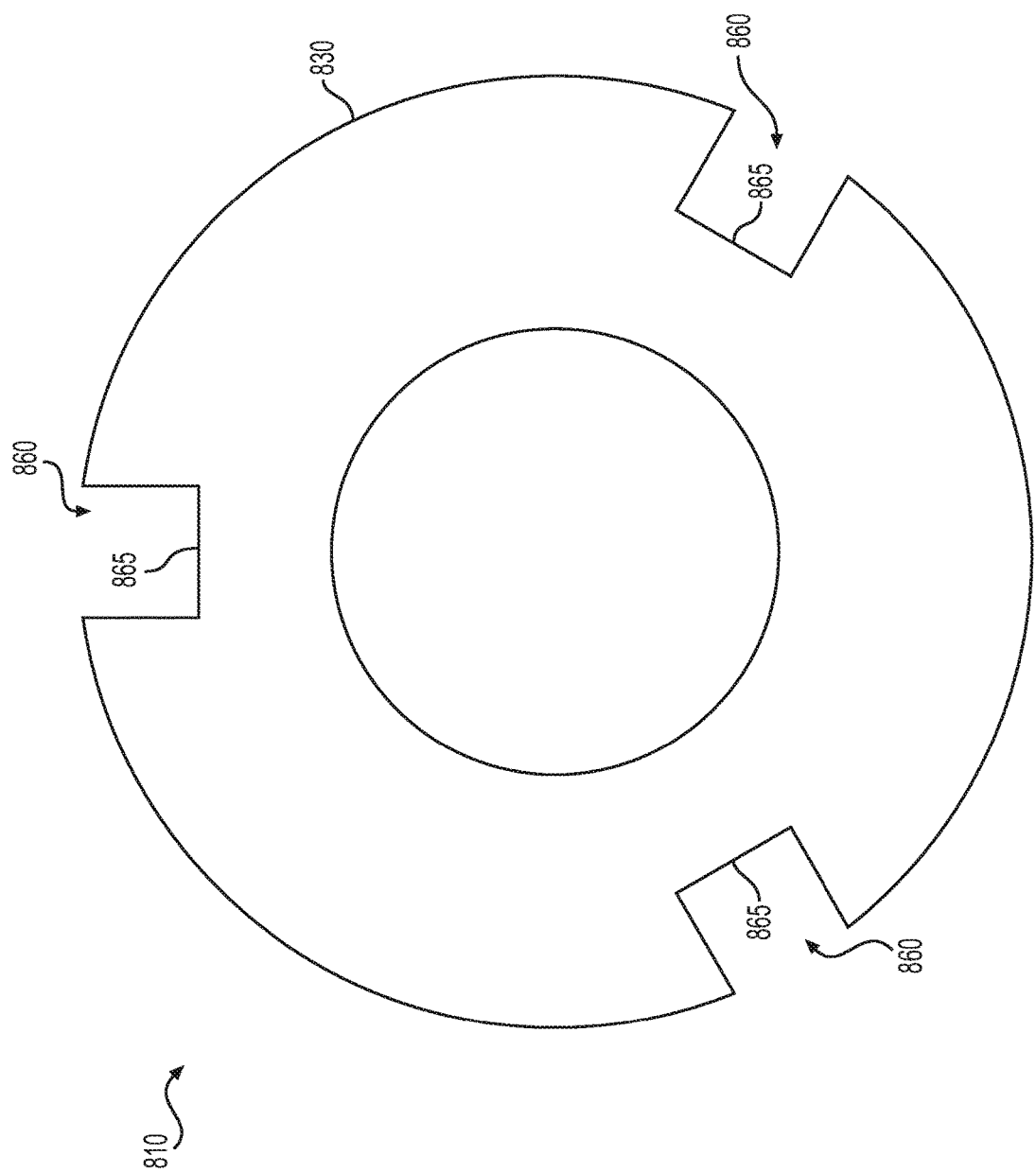
FIG. 9 is a cross-sectional view of the exemplary linear member of FIG. 8 along line IX-IX.

Referring to FIGS. 1-5, the axial grooves 60, 560 may include a U-shaped cross-sectional profile that tapers from the outer surface 30, 530 of the linear member 10, 510 to a curve at a radially innermost location 65, 565 of the axial groove 60, 560. In some embodiments, as shown in FIGS. 6 and 7, a linear member 610 may include axial grooves 660 having a V-shaped cross-sectional profile that tapers from the outer surface 630 of the linear member 610 to a point at a radially innermost location 665 of the axial groove 660. In other embodiments, as shown in FIGS. 8 and 9, a linear member 810 may include axial grooves 860 having a square or rectangular cross-sectional profile that extends from the outer surface 830 of the linear member 810 to a radially inner wall 865 of the axial groove 860.

Figure 10:
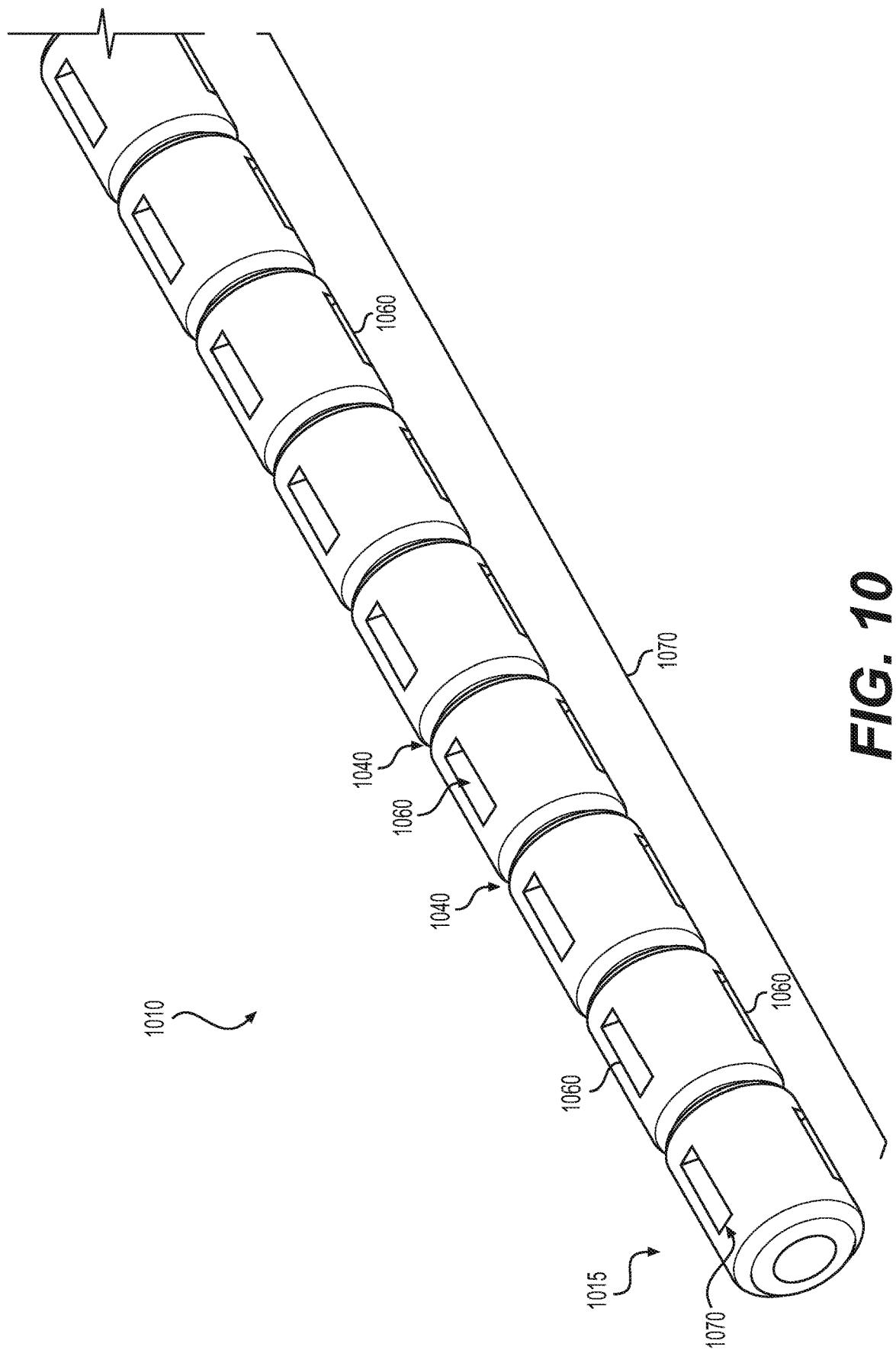
FIG. 10 is a perspective view of another exemplary embodiment of a linear member in accordance with various aspects of the disclosure.

Referring now to FIG. 10, an exemplary linear member 1010 according to the disclosure includes one or more series 1070 of sequentially-arranged axial grooves 1060. Each of the axial grooves 1060 extends over only a portion of a length of the linear member 1010. For example, each of the axial grooves 1060 of the series 1070 extends between a pair of annular grooves 1040 without intersecting with the annular grooves 1040. A connector (not shown) to be connected with an end 1015 of the linear member 1010 may include an engagement feature in the form of one or more axial ridges having a length that is equal to or less than the length of the respective axial groove(s) 1060 and being configured to be received by the axial groove(s) 1060 of the linear member 1010. In some aspects, the engagement feature may include a plurality of axially-aligned axial ridges and/or one or more circumferentially spaced axial ridges. Cooperative engagement between the engagement feature of the connector and the axial groove(s) 1060 of the linear member 1010 will prevent rotation of the linear member 1010 relative to the connector.

Figure 11:
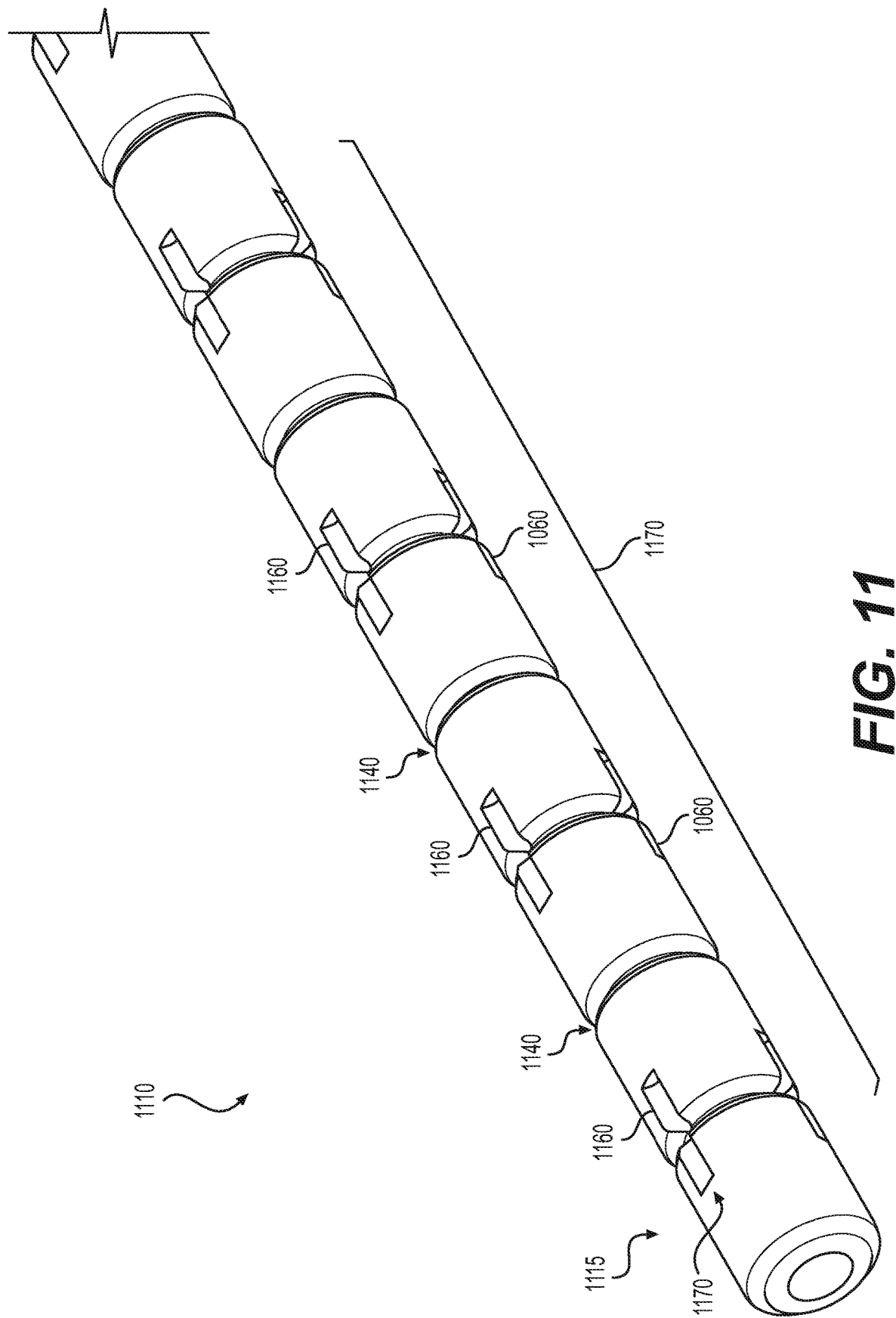
FIG. 11 is a perspective view of another exemplary embodiment of a linear member in accordance with various aspects of the disclosure.

Referring now to FIG. 11, an exemplary linear member 1110 according to the disclosure includes one or more series 1170 of sequentially-arranged axial grooves 1160. Each of the axial grooves 1160 intersects with an annular groove 1140. As shown in FIG. 10, each pair of adjacent axial grooves 1160 is spaced apart from one another such that an additional annular groove 1140 is between the pair of adjacent axial grooves 1160. In some embodiments, the axial grooves of a series may be spaced closer together such that each of the annular grooves 1140 may be intersected by an axial groove. A connector (not shown) to be connected with an end 1115 of the linear member 1110 may include an engagement feature in the form of one or more axial ridges having a length that is equal to or less than the length of the respective axial groove(s) 1160 and being configured to be received by the axial groove(s) 1160 of the linear member 1110. In some aspects, the engagement feature may include a plurality of axially-aligned axial ridges and/or one or more circumferentially spaced axial ridges. Cooperative engagement between the engagement feature of the connector and the axial groove(s) 1160 of the linear member 1110 will prevent rotation of the linear member 1110 relative to the connector.

Figure 12:
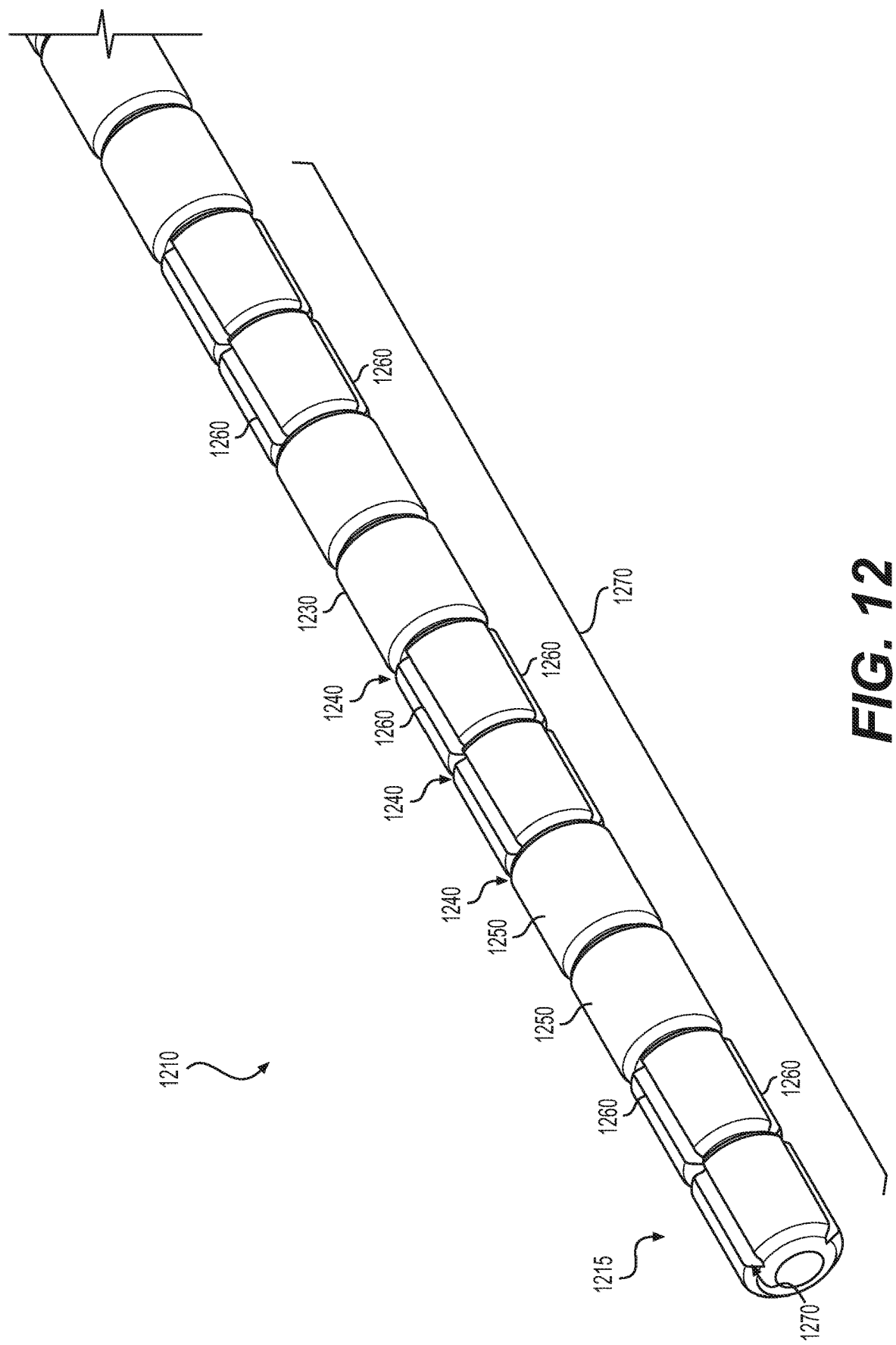
FIG. 12 is a perspective view of another exemplary embodiment of a linear member in accordance with various aspects of the disclosure.

Referring to FIG. 12, an exemplary linear member 1210 according to the disclosure includes one or more series 1270 of sequentially-arranged axial grooves 1260. Each of the axial grooves 1260 intersects with and extends for an axial length between three annular grooves 1240. As shown in FIG. 10, each pair of adjacent axial grooves 1260 is spaced apart from one another such that two sections 1250 of the outer surface 1230 of the linear member 1210 are between the pair of adjacent axial grooves 1260. In some embodiments, the axial grooves of a series may be spaced closer together such that only one section 1250 of the outer surface 1230 of the linear member 1210 is between the pair of adjacent axial grooves. A connector (not shown) to be connected with an end 1215 of the linear member 1210 may include an engagement feature in the form of one or more axial ridges having a length that is equal to or less than the length of the respective axial groove(s) 1260 and being configured to be received by the axial groove(s) 1260 of the linear member 1210. In some aspects, the engagement feature may include a plurality of axially-aligned axial ridges and/or one or more circumferentially spaced axial ridges. Cooperative engagement between the engagement feature of the connector and the axial groove(s) 1260 of the linear member 1210 will prevent rotation of the linear member 1210 relative to the connector.

The foregoing description of exemplary embodiments provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A fiber optic cable assembly comprising:
   a fiber optic cable; and
   a fiber optic connector, wherein the fiber optic cable has an outer surface that includes:
     a plurality of annular grooves spaced apart from one another in an axial direction of the fiber optic cable; and
     a plurality of axial grooves that extend in the axial direction, the plurality of axial grooves being spaced apart from one another in a circumferential direction of the fiber optic cable;
     wherein the plurality of axial grooves are configured to divide the outer surface in a circumferential direction of the fiber optic cable into separate sections;
   wherein the separate sections are configured to hinge against each other such that the fiber optic cable is bendable to a predetermined bend radius;
   wherein the fiber optic connector includes an axial ridge configured to be received by one of the plurality of axial grooves; and
   wherein cooperative engagement between the axial ridge of the fiber optic connector and the one of the plurality of axial grooves of the fiber optic cable prevents rotation of the fiber optic cable relative to the fiber optic connector.

2. The fiber optic cable assembly of claim 1, wherein the fiber optic connector includes a plurality of axial ridges corresponding to the plurality of axial grooves of the fiber optic cable.

3. An optical fiber device for coupling with a connector comprising:
   an annular groove portion that forms a limited hinge portion that prevents the optical fiber device from exceeding a maximum bend radius of the optical fiber device;
   an axial groove portion that extends in an axial direction of the optical fiber device;
   wherein the axial groove portion is configured to form a non-rotatable portion between the optical fiber device and an axial engagement portion of a connector; and
   wherein the non-rotatable portion prevents rotation of the axial groove portion of the optical fiber relative to the axial engagement portion of the connector.

4. The optical fiber device of claim 3, wherein the axial engagement portion of the connector comprises an axial ridge portion.

5. The optical fiber device of claim 3, wherein the axial groove portion comprises a first axial groove portion, and further comprising a second axial groove portion that is configured to separate first and second sections of an outer surface of the optical fiber device relative to a circumferential direction of the optical fiber device.

6. The optical fiber device of claim 3, wherein the annular groove portion comprises a first annular groove portion, and further comprising a second annular groove portion that is configured to separate first and second sections of the outer surface of the optical fiber device.

7. The optical fiber device of claim 6, wherein the separate first and second sections of the outer surface are configured to hinge against each other such that the optical fiber device is configured to bend without exceeding the maximum bend radius of the optical fiber device.

8. The optical fiber device of claim 3, wherein the optical fiber device comprises a duct, a cable, or a tube.

9. An optical fiber device for non-rotatably coupling to a connector comprising:
   an annular portion that is configured to form a limited hinge portion that allows the optical fiber device to selectively bend without exceeding a maximum bend radius of the optical fiber device;
   an axial portion that extends toward an axial direction of the optical fiber device;
   wherein the axial portion is configured to form a coupled portion between the optical fiber device and an axial engagement portion of a connector; and
   wherein the coupled portion prevents rotation of the axial portion of the optical fiber relative to the axial engagement portion of the connector.

10. The optical fiber device of claim 9, wherein the axial engagement portion of the connector comprises an axial ridge portion.

11. The optical fiber device of claim 9, wherein the axial portion comprises an axial groove portion.

12. The optical fiber device of claim 9, wherein the annular portion comprises an annular groove portion.

13. The optical fiber device of claim 9, wherein the axial portion comprises a first axial portion, and further comprising a second axial portion that is configured to separate first and second sections of an outer surface of the optical fiber device relative to a circumferential direction of the optical fiber device.

14. The optical fiber device of claim 9, wherein the annular portion comprises a first annular portion, and further comprising a second annular portion that is configured to separate first and second sections of the outer surface of the optical fiber device.

15. The optical fiber device of claim 14, wherein the separate first and second sections of the outer surface are configured to hinge against each other such that the optical fiber device is configured to bend without exceeding the maximum bend radius of the optical fiber device.

16. The optical fiber device of claim 10, wherein the optical fiber device comprises a duct, a cable, or a tube.

17. A fiber optic cable assembly comprising:
  a fiber optic cable that includes an axial groove portion and an annular groove portion that is configured to prevent the fiber optic cable from exceeding a maximum bend radius;
  a fiber optic connector that includes an axial ridge portion that is configured to be received by the axial groove portion of the fiber optic cable so as to form a non-rotatable portion between the fiber optic cable and the fiber optic connector; and
  wherein the non-rotatable portion between the fiber optic cable and the fiber optic connector prevents rotation of the fiber optic cable relative to the fiber optic connector during operation of the fiber optic cable assembly.

18. The fiber optic cable assembly of claim 17, wherein the axial groove portion of the fiber optic cable comprises a plurality of axial groove portions, the axial ridge portion of the fiber optic connector comprises a plurality of axial ridge portions, and the non-rotatable portion comprises a plurality of non-rotatable portions.

19. The fiber optic cable assembly of claim 18, wherein the plurality of annular grooves are configured to be spaced apart from one another in axial direction of the fiber optic cable.

20. The fiber optic cable assembly of claim 18, wherein the plurality of axial grooves are configured to divide the outer surface in a circumferential direction of the fiber optic cable into separate sections; and
  wherein the separate sections are configured to hinge against each other such that the fiber optic cable is bendable to a predetermined bend radius.

21. An optical fiber device for coupling with a connector comprising:
  an annular groove means for forming a limited hinge means that prevents the optical fiber device from exceeding a maximum bend radius of the optical fiber device;
  an axial groove means for forming a non-rotatable portion between the optical fiber device and an axial engagement portion of a connector; and
  wherein the non-rotatable portion is configured to prevent rotation of the axial groove means of the optical fiber relative to the axial engagement means of the connector.

22. The optical fiber device of claim 21, wherein the axial engagement portion of the connector comprises an axial ridge portion.

23. The optical fiber device of claim 21, wherein the axial groove means comprises a first axial groove means, and further comprising a second axial groove means for separating first and second sections of an outer surface of the optical fiber device relative to a circumferential direction of the optical fiber device.

24. The optical fiber device of claim 21, wherein the annular groove means comprises a first annular groove means, and further comprising a second annular groove means for separating first and second sections of the outer surface of the optical fiber device.

25. The optical fiber device of claim 24, wherein the separate first and second sections of the outer surface are configured to hinge against each other such that the optical fiber device is configured to bend without exceeding the maximum bend radius of the optical fiber device.

26. The optical fiber device of claim 21, wherein the optical fiber device comprises a duct, a cable, or a tube.

27. An optical fiber device for non-rotatably coupling to a connector comprising:
  an annular means for forming a limited hinge portion that allows the optical fiber device to selectively bend without exceeding a maximum bend radius of the optical fiber device;
  an axial means for forming a coupled portion between the optical fiber device and an axial engagement portion of a connector; and
  wherein the coupled portion is structurally configured to prevent rotation of the axial means of the optical fiber relative to the axial engagement portion of the connector.

28. The optical fiber device of claim 27, wherein the axial engagement portion of the connector comprises an axial ridge portion.

29. The optical fiber device of claim 27, wherein the axial means comprises an axial groove portion.

30. The optical fiber device of claim 27, wherein the annular means comprises an annular groove portion.

31. The optical fiber device of claim 27, wherein the axial means comprises a first axial means, and further comprising a second axial means for separating first and second sections of an outer surface of the optical fiber device relative to a circumferential direction of the optical fiber device.

32. The optical fiber device of claim 27, wherein the annular means comprises a first annular means, and further comprising a second annular means for separating first and second sections of the outer surface of the optical fiber device.

33. The optical fiber device of claim 32, wherein the separate first and second sections of the outer surface are configured to hinge against each other such that the optical fiber device is configured to bend without exceeding the maximum bend radius of the optical fiber device.

34. The optical fiber device of claim 27, wherein the optical fiber device comprises a duct, a cable, or a tube.

35. A fiber optic cable assembly comprising:
  a fiber optic cable that includes an axial groove means and an annular groove means for preventing the fiber optic cable from exceeding a maximum bend radius;
  a fiber optic connector that includes an axial ridge means for forming a non-rotatable portion between the fiber optic cable and the fiber optic connector; and
  wherein the non-rotatable portion between the fiber optic cable and the fiber optic connector prevents rotation of the fiber optic cable relative to the fiber optic connector during operation of the fiber optic cable assembly.

36. The fiber optic cable assembly of claim 35, wherein the axial groove means of the fiber optic cable comprises a plurality of axial groove means, the axial ridge means of the fiber optic connector comprises a plurality of axial ridge means, and the non-rotatable portion comprises a plurality of non-rotatable portions.

37. The fiber optic cable assembly of claim 35, wherein the plurality of annular grooves are configured to be spaced apart from one another in axial direction of the fiber optic cable.

38. The fiber optic cable assembly of claim 35, wherein the plurality of axial grooves are configured to divide the outer surface in a circumferential direction of the fiber optic cable into separate sections; and
  wherein the separate sections are configured to hinge against each other such that the fiber optic cable is bendable to a predetermined bend radius.

39. A fiber optic cable comprising:
  an outer surface that includes an annular groove; and
  an axial groove that extends in an axial direction of the fiber optic cable;

an additional annular groove that separates sections of the outer surface;
wherein the axial groove is configured to be gripped by a connector to prevent rotation of the fiber optic cable relative to the connector; and
wherein the separate sections are configured to hinge against each other such that the fiber optic cable is bendable to a predetermined bend radius.

40. The fiber optic cable of claim 39, further comprising an additional axial groove in the outer surface that extends in the axial direction and separates sections of the outer surface in a circumferential direction of the fiber optic cable.

41. A fiber optic cable comprising:
an outer surface that includes an annular groove;
an additional annular groove that separate sections of the outer surface;
a fiber optic connector;
an axial groove that extends in an axial direction of the fiber optic cable, wherein the axial groove is configured to be gripped by a connector to prevent rotation of the fiber optic cable relative to the connector;
wherein the connector includes an engagement feature configured to be received by the axial groove of the fiber optic cable; and
wherein the connector is a fiber optic connector and the fiber optic cable is a fiber optic cable.

42. The fiber optic cable of claim 41, wherein the engagement feature is an axial ridge configured to be received by the axial groove.

43. The fiber optic cable of claim 41, wherein cooperative engagement between the engagement feature of the connector and the axial groove of the fiber optic cable prevents rotation of the fiber optic cable relative to the connector.

44. A fiber optic cable comprising:
an outer surface that includes an annular groove;
an additional annular groove that separate sections of the outer surface;
an axial groove that extends in an axial direction of the fiber optic cable;
a connector that engages with the axial groove to prevent rotation of the fiber optic cable relative to the connector; and
wherein the separate sections are configured to hinge against each other such that the fiber optic cable is bendable to a predetermined bend radius.

45. The fiber optic cable of claim 44, further comprising an additional axial groove in the outer surface that extends in the axial direction and separates sections of the outer surface in a circumferential direction of the fiber optic cable.

46. The fiber optic cable of claim 44, wherein the fiber optic cable is a duct, a cable, or a tube.

47. A optical fiber cable comprising:
an outer surface that includes a first annular groove;
a second annular groove that is configured to separate sections of the outer surface;
an axial groove that is configured to extend in an axial direction of the fiber optic cable;
wherein the axial groove is configured to form a cooperative coupling structure with an engagement portion of a connector;
wherein the cooperative coupling structure prevents rotation of the fiber optic cable relative to the connector; and
wherein the connector comprises a fiber optic connector and the fiber optic cable comprises a fiber optic cable.

48. The fiber optic cable of claim 47, wherein the engagement portion comprises an axial ridge that is configured to be received by the axial groove of the fiber optic cable so as to form the cooperative coupling structure and to prevent rotation of the fiber optic cable relative to the connector.

49. A fiber optic cable comprising:
an outer surface that includes an annular groove;
an axial groove that extends in an axial direction of the fiber optic cable;
wherein the axial groove is configured to form a non-rotatable portion between the fiber optic cable and an axial engagement portion of a connector;
wherein the non-rotatable portion prevents rotation of the axial groove of the fiber optic cable relative to the axial engagement portion of the connector;
wherein the annular groove comprises a first annular groove, and further comprising a second annular groove that is configured to separate first and second sections of the outer surface; and
wherein the separate first and second sections of the outer surface are configured to hinge against each other such that the fiber optic cable is configured to bend without exceeding a predetermined bend radius.

50. The fiber optic cable of claim 49, wherein the axial engagement portion of the connector comprises an axial ridge portion.

51. The fiber optic cable of claim 49, wherein the axial groove comprises a first axial groove, and further comprising a second axial groove that is configured to separate first and second sections of the outer surface along a circumferential direction of the fiber optic cable.

52. The fiber optic cable of claim 49, wherein the fiber optic cable comprises a duct, a cable, or a tube.

53. A fiber optic cable comprising:
an outer surface that includes an annular groove;
an axial groove that extends in an axial direction of the fiber optic cable;
wherein the axial groove is configured to form a non-rotatable portion between the fiber optic cable and an axial engagement portion of a connector;
wherein the non-rotatable portion prevents rotation of the axial groove of the fiber optic cable relative to the axial engagement portion of the connector; and
wherein the separate first and second sections of the outer surface of the optical fiber cable are configured to hinge against each other so as to prevent the optical fiber cable from bending beyond a predetermined bend radius during operation of the optical fiber cable.

54. The fiber optic cable of claim 53, wherein the axial engagement portion of the connector comprises an axial ridge portion.

55. The fiber optic cable of claim 53, wherein the axial groove comprises a first axial groove, and further comprising a second axial groove that is configured to separate first and second sections of the outer surface along a circumferential direction of the fiber optic cable.

56. The fiber optic cable of claim 53, wherein the annular groove comprises a first annular groove, and further comprising a second annular groove that is configured to separate first and second sections of the outer surface.

57. The fiber optic cable of claim 53, wherein the fiber optic cable comprises a duct, a cable, or a tube.

* * * * *